United States Patent [19]
Bazin et al.

[11] 4,214,261
[45] Jul. 22, 1980

[54] SYNCHRONIZING APPARATUS FOR REMOTE TELEVISION APPARATUS

[75] Inventors: Lucas J. Bazin, Vincentown; Gary R. Peterson, Runnemede; Dennis M. Schneider, Sewell, all of N.J.

[73] Assignee: RCA Corporation, New York, N.Y.

[21] Appl. No.: 2,726

[22] Filed: Jan. 11, 1979

[51] Int. Cl.² .............................................. H04N 9/46
[52] U.S. Cl. ..................................... 358/19; 358/149
[58] Field of Search ................................. 358/149, 19

[56] References Cited
U.S. PATENT DOCUMENTS

| | | |
|---|---|---|
| 3,368,034 | 2/1968 | Dischert et al. |
| 3,424,866 | 1/1969 | Hathaway . |
| 3,429,994 | 2/1969 | Pay et al. . |
| 3,493,680 | 2/1970 | Brown . |
| 3,588,351 | 6/1971 | Baun ..................................... 358/149 |

Primary Examiner—Richard Murray
Attorney, Agent, or Firm—Eugene M. Whitacre; Paul J. Rasmussen; Robert L. Troike

[57] ABSTRACT

A synchronizing apparatus for compensating for cable length changes between a remote color television camera and a local control point is described. The color camera is of the type adapted to receive a "gen-lock" type reference signal for synchronization. The apparatus is responsive to the "gen-lock" signal and the signal from the television camera for generating a "gen-lock" type signal phase advanced to compensate for cable delays.

7 Claims, 2 Drawing Figures

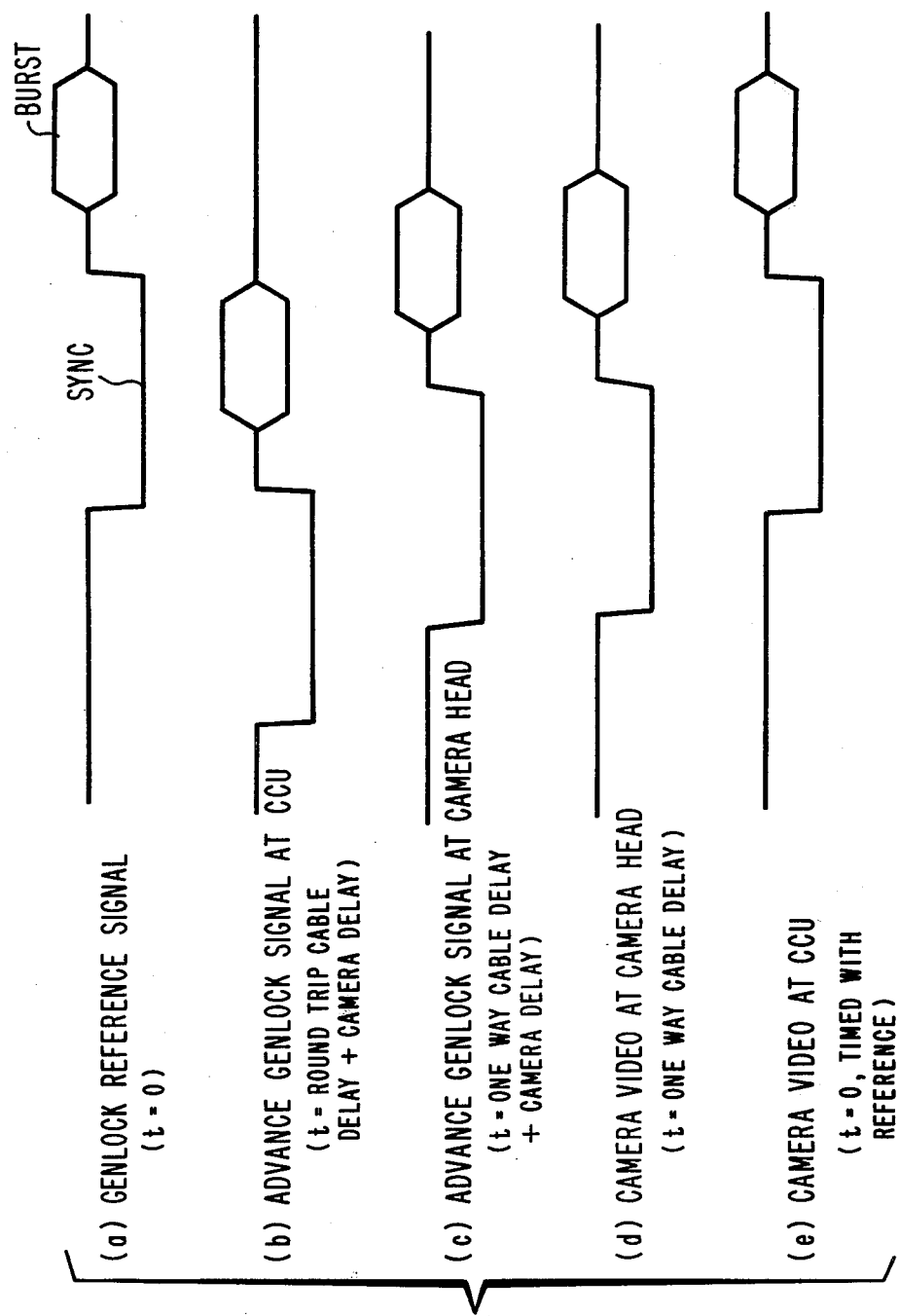

SYNCHRONIZING APPARATUS FOR REMOTE TELEVISION APPARATUS

BACKGROUND OF THE INVENTION

This invention relates to synchronizing apparatus for television apparatus and more particularly to television cameras and other apparatus such as video tape machines having a "gen-lock" reference input.

The "gen-lock" is a composite signal containing the horizontal phasing, vertical phasing, and color burst information. A typical television camera head contains circuitry for generating a composite video signal including the horizontal and vertical sync and the color burst signal. The "gen-lock" input terminal of the camera is used to cause the camera to be placed in time coincidence with this "gen-lock" reference signal. The camera may operate on its own reference signals when used, for example, for video tape recording or may be synchronized to a reference via its "gen-lock" input terminal. The camera head may be located at various locations which may be remote from a central or camera control unit location. Cable is usually coupled from this control location to the camera head. The local reference at the control location is coupled to the "gen-lock" input terminal of the camera head and the composite video from the camera head is coupled via a cable to the central control point which may be located at a video switcher. The camera cable length is changeable and this changeability of the cable length produces timing problems at the video switcher. Applicant herein provides a solution to this problem which is convenient and is readily adaptable for use with the existing "gen-lock" input terminal at the camera head.

It is known in the prior art to provide a synchronizing apparatus for compensating for horizontal sync changes for varying cable lengths. This is illustrated, for example, in U.S. Pat. No. 3,429,994 of D. A. Pay et al or No. 3,368,034 of R. A. Dischert et al. These systems do not correct for color phase. The camera head circuitry itself is specially modified for handling the sync signals.

Hathaway, U.S. Pat. No. 3,424,866 describes a synchronizing apparatus for compensating for sync using submultiple frequencies of the horizontal line repetition rate to permit the synchronizing signal to be transmitted over an audio circuit. Although, Brown, U.S. Pat. No. 3,493,680 describes color phase locking via an audio circuit, these signals are neither composite sync and burst signals nor composite sync and burst as normally associated with a "gen-lock" signal and therefore not adaptable for use at the "gen-lock" input of a typical camera head.

SUMMARY OF THE INVENTION

Briefly, an improved synchronizing apparatus for compensating for changeable cable lengths between a remote color television apparatus and a local control point where the remote apparatus is of the type adapted to receive a composite sync and burst type signal is provided. The synchronizing apparatus is located at the local control point and is responsive to the received television apparatus signals at the output of the cable and the composite reference signals for generating a composite reference signal to be sent via a cable to the reference input of the remote apparatus that is advanced such that the composite output from the cable is compensated for cable delays.

DESCRIPTION OF THE DRAWINGS

FIG. 2 is a timing diagram illustrating the operation of the system.

DESCRIPTION OF A PREFERRED EMBODIMENT

Figure 1:
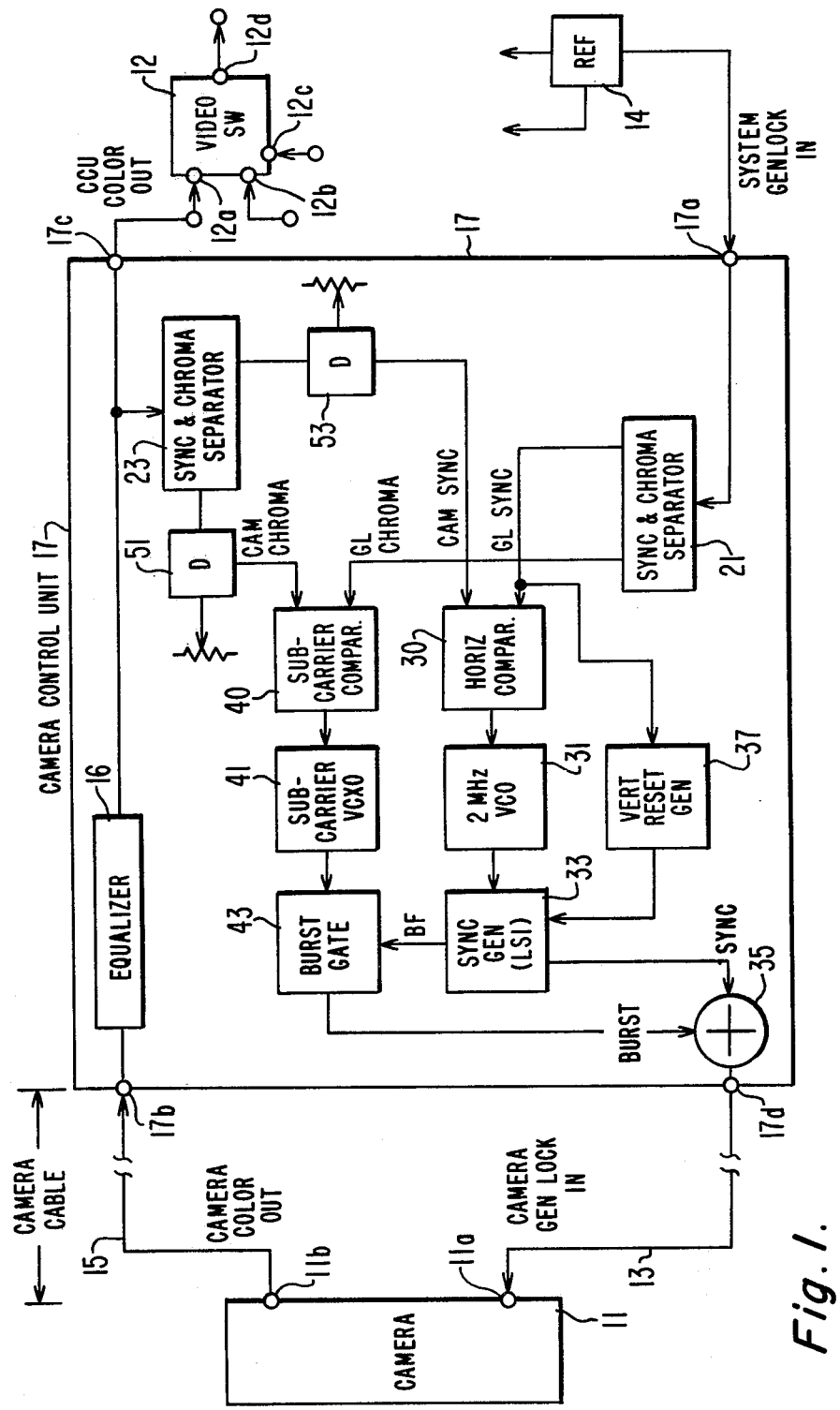
FIG. 1 is a block diagram of the synchronizing system.

Referring to FIG. 1 there is illustrated a block diagram of the synchronizing system comprising the camera head 11, the camera cables 13 and 15, and the synchronizing apparatus referred to herein as the camera control unit 17. The camera head 11 is of the type adapted to receive a "gen-lock" signal at its input terminal and to generate a composite camera video output. The camera head 11 includes a sync and burst separator and two voltage controlled oscillators, a sync chip, a pair of mixers, and typical color camera equipment. The camera head 11 includes means for separating the sync and burst signals and means for comparing these signals in separate mixers from that generated in the camera by the sync chip and the color voltage controlled oscillator. The camera head further includes means for synchronizing the phase of the camera subcarrier oscillator to that of the incoming reference burst, for synchronizing the horizontal sync oscillator to that of the incoming reference sync, and for providing the composite video signal synchronized to the "gen-lock" signal at the "gen-lock" input of the camera head.

At the operator's console for example is located a video switcher 12 for switching the composite video from various camera sources (sources at terminals 12a, 12b, and 12c) to a common output at terminal 12d. There is a camera control unit for each of the remotely located cameras. The video switcher 12 and the camera control unit may be located at the operator's console. The camera control unit 17 for camera head 11 is responsive to a "gen-lock" reference signal from source 14 for all cameras associated with switcher 12 for generating a composite advanced "gen-lock" signal which is used to synchronize the remote camera head 11 so that at the output 12d of the camera control unit 17 the composite video signal is synchronized to the "gen-lock" reference signal from common source 14. In this manner all of the signals at the video switcher are synchronized. The camera control unit 17 corrects for phase errors due to cable lengths that may vary from camera heads to the video switcher 12.

As mentioned previously the "gen-lock" reference signal is a composite signal containing horizontal and vertical sync and color burst phasing information. The composite signal received at the "gen-lock" input 17a of the camera control unit 17 from reference source 14 (common for all cameras associated with switcher 12) is separated by the sync and chroma burst separator 21. The composite video from the camera head 11 at terminal 11b is coupled via cable 15 from the camera head 11 to camera control unit 17 at termnal 17b. The camera control unit 17 includes an automatic cable equalizer 16 as described in co-pending U.S. application of L. Bazin, Ser. No. 811,291, filed June 29, 1977 entitled, "AUTOMATIC CABLE EQUALIZER CIRCUIT." The output from terminal 17b is applied to cable equalizer 16. The output from cable equalizer 16 is applied via camera control unit output terminal 17c to switcher 12. A portion of the composite video signal from the camera head 11 and equalizer 16 is applied to a sync and burst separator 23 and separated into the separate camera horizontal sync and camera burst signals.

Two phase-lock loops in camera control unit 17 are used to obtain independent horizontal sync and subcarrier phasing. The separated camera horizontal sync signals from the camera head 11 are compared with the separated input horizontal sync signals (GL sync) from the "gen-lock" reference input 17a at comparator 30. The difference or error signal from comparator 30 is fed to a voltage controlled oscillator 31 that generates a clock frequency for an LSI sync generator 33. The LSI sync generator 33 may be like type MM-5321 of National Semiconductors or Type 3262 of Fairchild. When there is no phase error or phase difference it is assumed that the oscillator is operating at the correct 2 MHz frequency and there is no correction or change in oscillator frequency or phase. If there is a phase error, the error signal from comarator 30 locks the oscillator 31 in the correct phase. The phase of oscillator 31 is phase advanced. The phase advanced output sync signal from the LSI sync generator 33 is applied to an adder 35. The oscillator 31 is phase advanced such that the received sync from the camera head at the output 17c of the control unit is synchronized with the "gen-lock" input at terminal 17a. A vertical reset generator 37 is responsive to the second serrated vertical pulse, for example, from the sync and chroma separator 21 to detect the vertical reset interval and provide a vertical pulse to the LSI sync generator 33. The LSI sync generator 33 provides both the horizontal and vertical sync signals timed by oscillator 31 and generator 37 to the adder 35.

The detected burst signal (CAM burst) from the separator 23 (from the camera head) is compared at subcarrier comparator 40 with the burst "gen-lock" reference signal from separator 21. A difference or error voltage from comparator 40 is applied to a color subcarrier frequency voltage controlled crystal oscillator 41 operating at the color burst frequency of 3.58 MHz. The oscillator 41 is phase advanced such that the received burst signal from the camera head 11 at the output 17c of camera control unit 17 is at the reference "gen-lock" phase.

This advanced color frequency signal is gated via gate 43 at the correct time period to the adder 35 by a control signal from the sync generator 33 to form a color burst signal. A composite "advanced gen-lock" signal is thereby formed out of the adder 35 and sent to the camera head 11 "gen-lock" input 11a via cable 13 and terminal 17d.

The camera control unit 17 thereby produces an advanced "gen-lock" signal containing sync and color burst phase information which will phase the camera head 11 signal being time coincidence with the "gen-lock" signal at the camera control unit end of the cable. The amount of phase advance of the advanced "gen-lock" signal will increase when the length of the camera cable is increased because the comparison of the composite camera output signal with reference "gen-lock" signal inut is physically at the camera control unit or the video switcher end of the cables. The camera cable length is in the loop and any change in length of the camera cable will be automatically corrected by the loop. Similarly, if any drift occurs in the camera head "gen-lock" circuitry, this error will be automatically compensated.

The waveforms of FIG. 2 illustrate the phases of the signal. Waveform 2a illustrates "gen-lock" reference signal. Waveform 2b illustrates the advanced "gen-lock" signal at the camera control unit. Waveform 2c illustrates the advanced "gen-lock" signal at camera head. Waveform 2d illustrates the camera video at the camera head and waveform 2e illustrates the camera video at the camera control unit.

Also incorporated in the synchronizing apparatus may be variable delays 51 and 53 in the chroma and horizontal sync loops which act as timing controls to phase the composite color video to the video switcher 12. The delays may operate to further increase the advance of the advanced "gen-lock" signal to accommodate the distance from the camera control unit 17 to the actual video switcher 12. These delays may be variable in order to compensate for varying lengths from the camera control unit to the video switcher.

What is claimed is:

1. A synchronizing apparatus for use in a television system including a remote color television signal generating apparatus of the type having an input terminal adapted to receive a composite sync and burst reference signal from a reference signal source for providing at an output terminal a composite television signal synchronized to the composite sync and burst reference signal, a first cable coupled at one end to said one input terminal of said remote television apparatus and a second cable coupled at one end to said output terminal of said remote television apparatus, comprising:

first means adapted to be coupled to said second cable at the end opposite said one end for separating the sync and color burst signals from said composite television signal from said television apparatus;

second means responsive to said composite sync and burst reference signal from said reference signal source for separating said composite reference signal to provide a separate reference sync signal and reference color burst signal;

third means responsive to said color burst signals from said remote apparatus and said reference color burst signals for generating advanced color burst signals to compensate for delays through said cables;

fourth means responsive to said apparatus sync signals from said remote apparatus and said reference sync signals for generating advanced sync signals to compensate for delays through said cables; and fifth means adapted to be coupled to said first cable at the end opposite said one end and responsive to said advanced color burst signals and said advanced sync signals for providing to said television apparatus advanced composite sync and color burst reference signals.

2. The combination of claim 1 wherein said composite reference signal is a "gen-lock" type reference signal.

3. The combination of claim 2 wherein said remote television signal generating apparatus is a color television camera.

4. A synchronizing apparatus for compensating for changeable cable lengths between a remote color television signal generating apparatus and a local control point where said remote television apparatus is of the type having an input terminal adapted to receive a composite sync and color burst reference signal from a reference signal source for providing at an output terminal a composite television signal synchronized to the composite sync and burst reference signal, a first of said cables is coupled at one end to said one input terminal of said remote television apparatus and a second of said cables is coupled at one end to said output terminal of said remote television apparatus, said synchronizing apparatus comprising, in combination:

first means adapted to be coupled to said second cable at the end opposite said one end for separating the apparatus sync and color burst signals from said composite television signal from said television apparatus;

second means responsive to said composite sync and color burst reference signals from said reference signal source for separating said composite reference signals to provide separate reference sync signals and reference color burst signals;

third means responsive to said color burst signals from said remote apparatus and said reference color burst signals for generating color burst signals phase advanced such that said apparatus burst signals and said reference color burst signals are in phase at said local control point;

fourth means responsive to said apparatus sync signal from said remote apparatus and said reference sync signals for generating sync signals phase advanced such that said apparatus sync and said reference sync signals are in phase at said local control point; and fifth means adapted to be coupled to said first cable at the end opposite said one end and responsive to said advanced color burst signals and said advanced sync signals for providing to said television apparatus an advanced composite sync and color burst reference signals.

5. A system for synchronizing a remotely located color television signal generating device of the type having a "gen-lock" type input to a local "gen-lock" type reference signal comprising:

a local synchronizing apparatus having a pair of input terminals and a pair of output terminals;

a first cable coupled between a first output terminal of said synchronizing apparatus and the "gen-lock" input of said signal generating device;

a second cable coupled between said signal generating device output and a first input of said sychronizing apparatus;

said second input of said synchronizing apparatus adapted to receive said local "gen-lock" reference signal; and said synchronizing apparatus being responsive to said "gen-lock" reference and said composite color television output signal from said second cable at said first input for providing an advanced composite "gen-lock" type synchronizing signal to said first cable advanced to compensate for delays in said cables.

6. The combination of claim 5 wherein said generating device is a color television camera.

7. The combination of claim 5 wherein said synchronizing apparatus includes means for separating sync and color burst reference signals, means for separating sync and color burst signals from said composite television output signal, means for comparing said reference sync and said sync from said device for providing an advanced sync to compensate for cable delays, means for comparing said color burst reference signals and color burst from said device for providing an advanced color burst to compensate for cable delays, and means for combining said advanced color burst and advanced sync to provide said advanced composite reference signal.

* * * * *